US012347983B2

(12) United States Patent
Racho et al.

(10) Patent No.: US 12,347,983 B2
(45) Date of Patent: Jul. 1, 2025

(54) CONNECTOR FOR AN ELECTRICAL TERMINAL WITH A CRIMPED SPRING

(71) Applicant: Lear Corporation, Southfield, MI (US)

(72) Inventors: Edgar Michael T. Racho, Lapu-Lapu (PH); Alexzyev Dolumbal, Gothenburg (SE); Lewis Galligan, Novi, MI (US)

(73) Assignee: Lear Corporation, Southfield, MI (US)

( * ) Notice: Subject to any disclaimer, the term of this patent is extended or adjusted under 35 U.S.C. 154(b) by 301 days.

(21) Appl. No.: 18/071,784

(22) Filed: Nov. 30, 2022

(65) Prior Publication Data

US 2024/0178624 A1 May 30, 2024

(51) Int. Cl.

*H01R 24/20* (2011.01)
*H01R 4/18* (2006.01)
*H01R 12/77* (2011.01)
*H01R 13/50* (2006.01)
*H01R 24/50* (2011.01)

(52) U.S. Cl.

CPC ............... *H01R 24/50* (2013.01); *H01R 4/18* (2013.01); *H01R 12/77* (2013.01); *H01R 12/774* (2013.01); *H01R 13/501* (2013.01)

(58) Field of Classification Search

CPC ........ H01R 24/20; H01R 4/18; H01R 13/501; H01R 4/185; H01R 12/63; H01R 13/422; H01R 13/432; H01R 12/7058; H01R 12/77; H01R 12/774; H01R 13/02; H01R 13/428

See application file for complete search history.

(56) References Cited

U.S. PATENT DOCUMENTS 4,082,402 A * 4/1978 Kinkaid ............... H01R 4/2495 439/877
6,722,034 B2 4/2004 Enomoto et al.
6,869,305 B2 3/2005 Enomoto et al.
7,040,914 B2 5/2006 Kuwayama et al.
7,462,062 B2 12/2008 Kumakura
7,509,732 B2 3/2009 Kumakura
7,682,180 B2 * 3/2010 Brown ............... H01R 13/4362 439/352
8,641,461 B2 2/2014 Mitose et al.
9,318,815 B2 4/2016 Mitose et al.
11,050,168 B2 6/2021 Racho et al.
2001/0016449 A1 8/2001 Aoki
2007/0254534 A1 11/2007 Okamura et al.
2021/0313723 A1 10/2021 Peterson et al.
2021/0408712 A1 * 12/2021 Myer ................... H01R 13/508
2021/0408715 A1 * 12/2021 Myer ................. H01R 13/4361
2022/0337001 A1 * 10/2022 Hetrick ................ H01R 12/613
2022/0407258 A1 * 12/2022 Racho ................ H01R 13/2442
2023/0056542 A1 * 2/2023 Raybold ............ H01R 13/4362
2023/0056567 A1 * 2/2023 Raybold ............ H01R 12/7023
2024/0332848 A1 * 10/2024 Zhou ...................... H01R 12/69

* cited by examiner

*Primary Examiner* — Travis S Chambers

(74) *Attorney, Agent, or Firm* — MacMillan, Sobanki & Todd, LLC

(57) ABSTRACT

An electrical connector includes a body with a terminal cavity that defines a terminal axis. The terminal cavity is adapted to accommodate an electrical terminal and has a contact area that includes a terminal lock. The terminal cavity also has a connection area that is open in a block direction that is perpendicular to the terminal axis. The electrical connector includes a block that is movable relative to the body to a latched position, and when the block is in the latched position it is located in the block direction from the connection area.

20 Claims, 15 Drawing Sheets

CONNECTOR FOR AN ELECTRICAL TERMINAL WITH A CRIMPED SPRING

BACKGROUND OF THE INVENTION

This invention relates to an electrical connector. More specifically, this invention relates to an electrical connector that is used to engage a flexible flat cable.

Conventional electrical systems commonly use groups of electrical wires to route electrical power and signals. Conventional round electrical wires are typically connected to electrical terminals which are inserted into connectors. Groups of the wires are may then be bundled together for easier handling. There has been an interest in using flexible flat cables instead of conventional wire bundles in some applications. The flexible flat cables can be easier to handle.

Conventional electrical terminals are often connected to round electrical wires by a crimped connection. The electrical terminal includes a first set of crimp wings that are deformed to engage an inner conductor on the wire to provide an electrical connection. A second set of crimp wings are also deformed to engage an outer insulator on the wire to provide a stronger mechanical connection. However, these crimped connections used to attach electrical terminals to conventional round wires are not necessarily compatible with the flexible flat cables. It would be desirable to provide an improved way to connect the electrical terminal to the flat flexible cable.

SUMMARY OF THE INVENTION

This invention relates to an electrical connector. The electrical connector includes a body with a terminal cavity. The terminal cavity defines a terminal axis and is also adapted to accommodate an electrical terminal. The terminal cavity has a contact area that includes a terminal lock. The terminal cavity also has a connection area that is open in a block direction. The block direction is perpendicular to the terminal axis. The electrical connector also includes a block that is movable relative to the body to a latched position. When the block is in the latched position, it is located in the block direction from the connection area.

In another embodiment, the terminal cavity extends through a connector end that is adjacent to the connection area. Further, the terminal cavity is open at the connector end. The electrical connector also includes a plurality of hooks that extend from the body in the block direction. The hooks are adapted to engage a flexible flat cable. Also, the block includes a plurality of spaces wherein each of the hooks is located in one of the spaces when the block is in the latched position. Additionally, when the block in the latched position, a catch is defined between the block and the body. The catch is a channel that extends at an angle relative to the terminal axis.

This invention also relates to an electrical connector assembly. The electrical connector assembly includes an electrical terminal located in the terminal cavity and retained in the terminal cavity by a terminal lock. The electrical terminal includes deformed crimp wings. The electrical connector assembly also includes a flexible flat cable. The flexible flat cable is located at least in part between the block and the electrical terminal when the block is in the latched position. The flexible flat cable includes a conductor that is engaged with the electrical terminal. When the block is in the latched position, the crimp wings are in a stressed position and the electrical terminal applies a spring force against the block.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
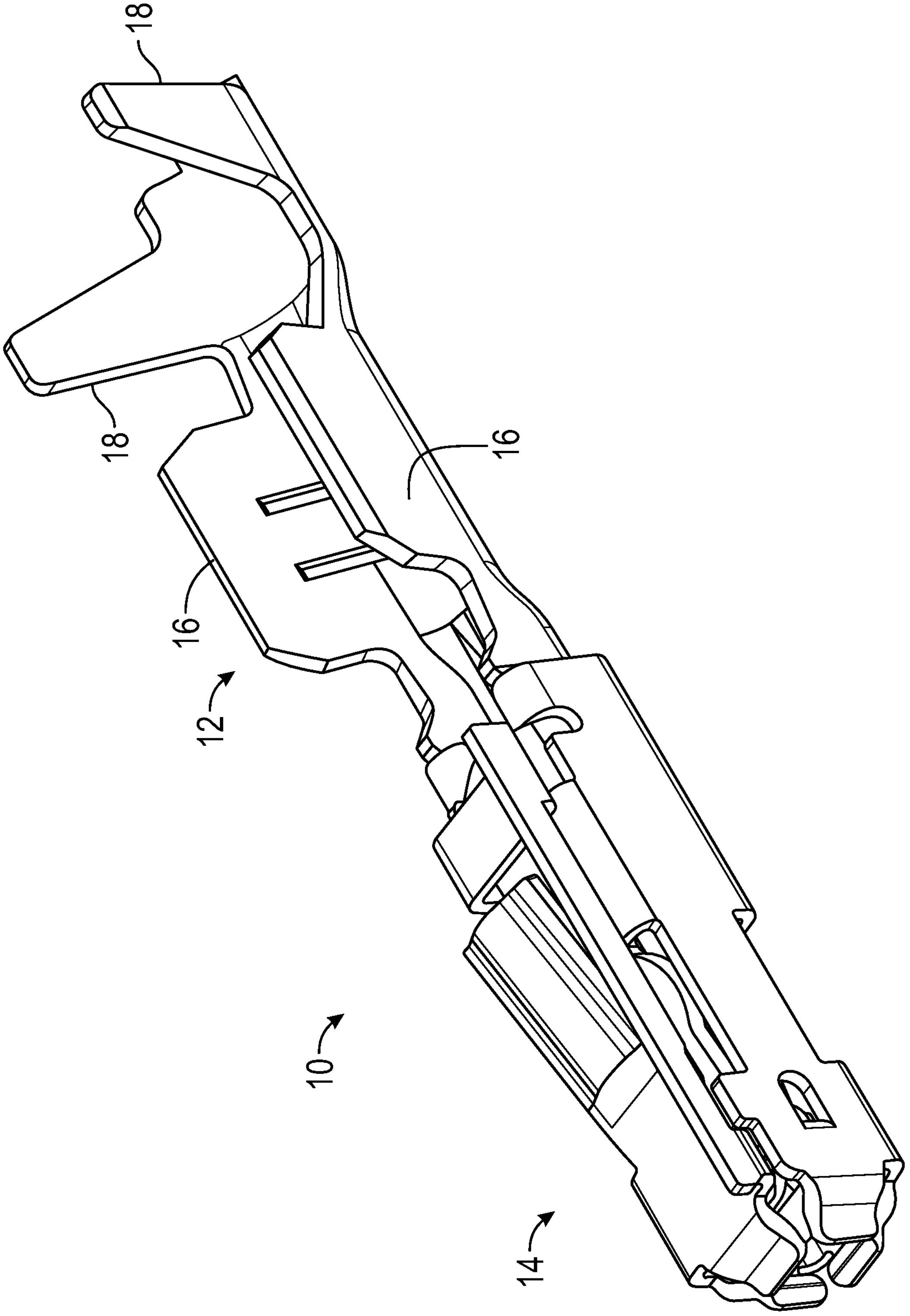
FIG. 1 (Prior Art)
FIG. 1 is a front perspective view of a prior art electrical terminal.

Referring now to the drawings there is illustrated in FIG. 1 a front perspective view of a prior art electrical terminal, indicated generally at 10. The electrical terminal 10 includes a crimp portion, indicated generally at 12, and is adapted to be crimped onto an electrical wire, as is known in the art. The electrical terminal 10 also includes a contact portion, indicated generally at 14, that is attached to the crimp portion 12 and that is adapted to engage a corresponding electrical terminal (not shown).

Figure 2:
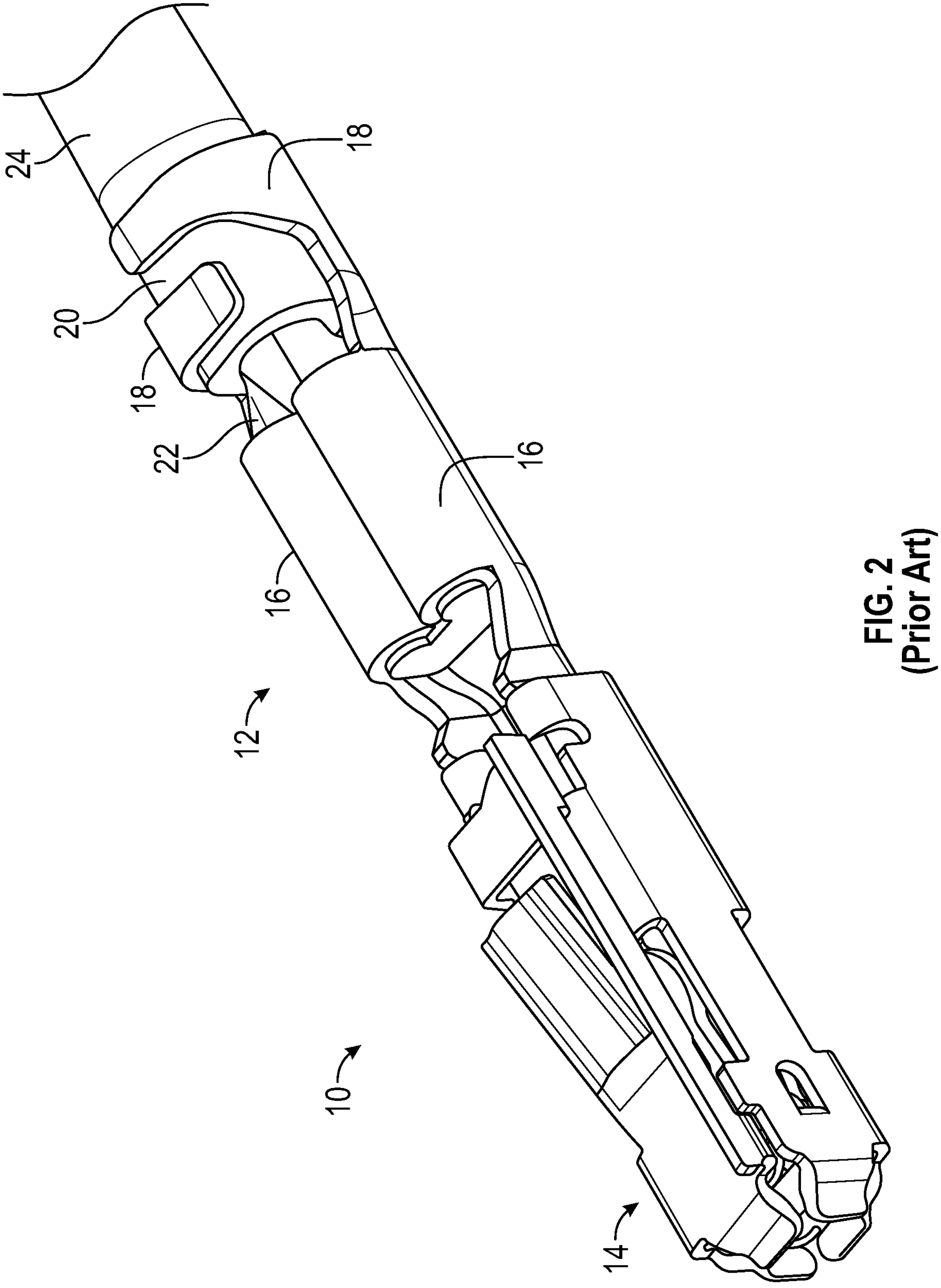
FIG. 2 (Prior Art)
FIG. 2 is a front perspective view similar to FIG. 1, showing the prior art electrical terminal attached to an electrical wire.

The crimp portion 12 includes two conductor wings 16, as well as two insulator wings 18. As shown in FIG. 2, when the electrical terminal 10 is crimped onto a conventional round electrical wire 20, the conductor wings 16 engage a conductor 22 of the wire 20 and the insulator wings 18 engage an outer insulator 24 of the wire 20. By engaging the conductor 22, the electrical terminal 10 is in electrical communication with the conductor 22. Further, by engaging the insulator 24, a stronger mechanical bond is created between the electrical terminal 10 and the wire 20. The electrical terminal 10 may be crimped to the wire 20 by hand or by machine, using a crimping device (not shown) as is known in the art.

Figure 3:
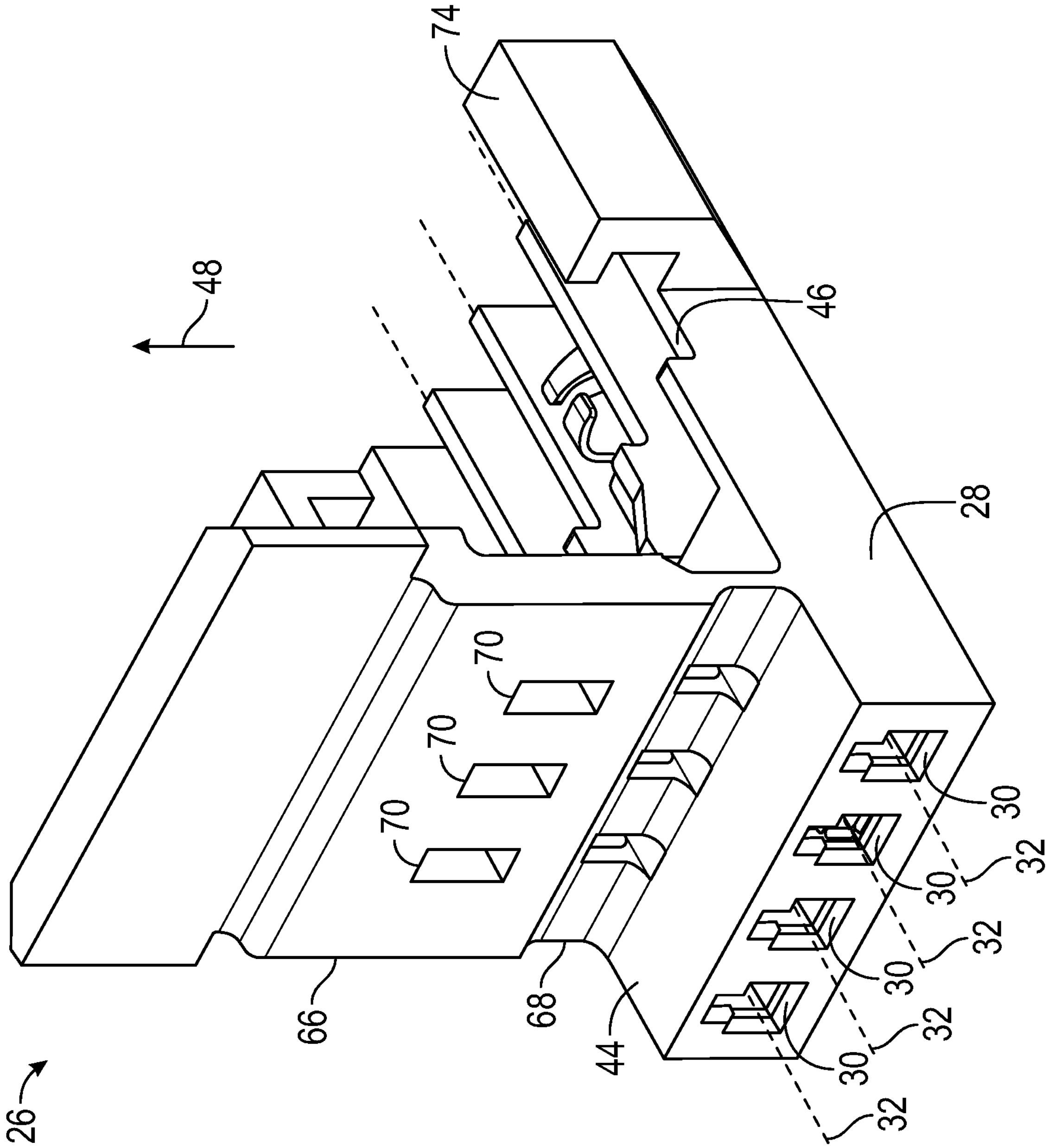
FIG. 3 is a front perspective view of an electrical connector is accordance with this invention.
Figure 5:
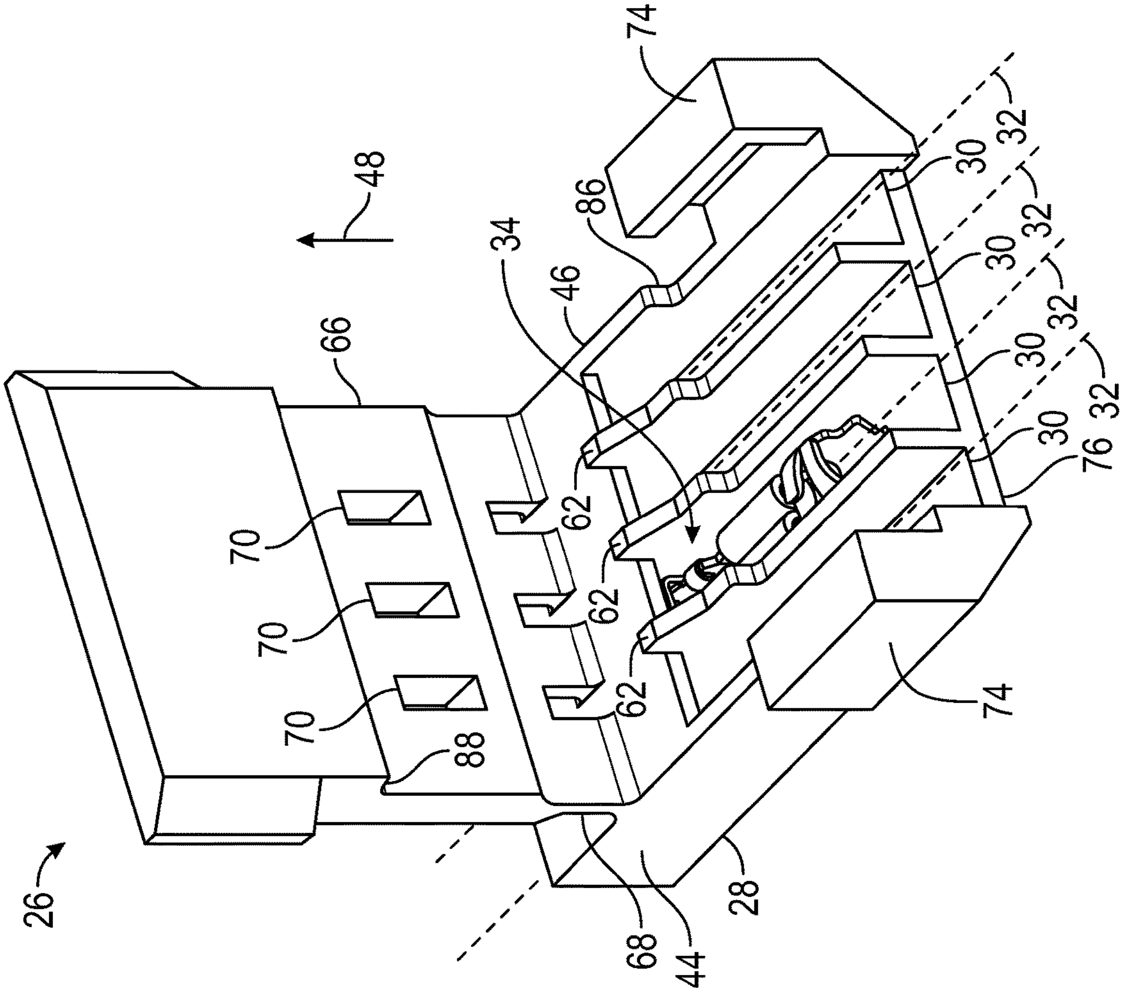
FIG. 5 is a rear perspective view of the electrical connector illustrated in FIG. 3 wherein the electrical terminal illustrated in FIG. 4 is visible in a terminal cavity of the electrical connector.

An electrical connector in accordance with this invention is shown in FIGS. 3 and 5 and is indicated generally at 26. The illustrated electrical connector 26 is a single piece and is molded from plastic. However, the electrical connector 26 may be made of multiple components if desired and may be composed of any desired material or combination of materials and may be manufactured using any desired process. The electrical connector 26 includes a body 28. Terminal cavities 30 extend through the body 28 and each terminal cavity 30 defines a respective terminal axis 32. The illustrated electrical connector 26 includes four terminal cavities 30 but may include any desired number of terminal cavities 30.

Figure 4:
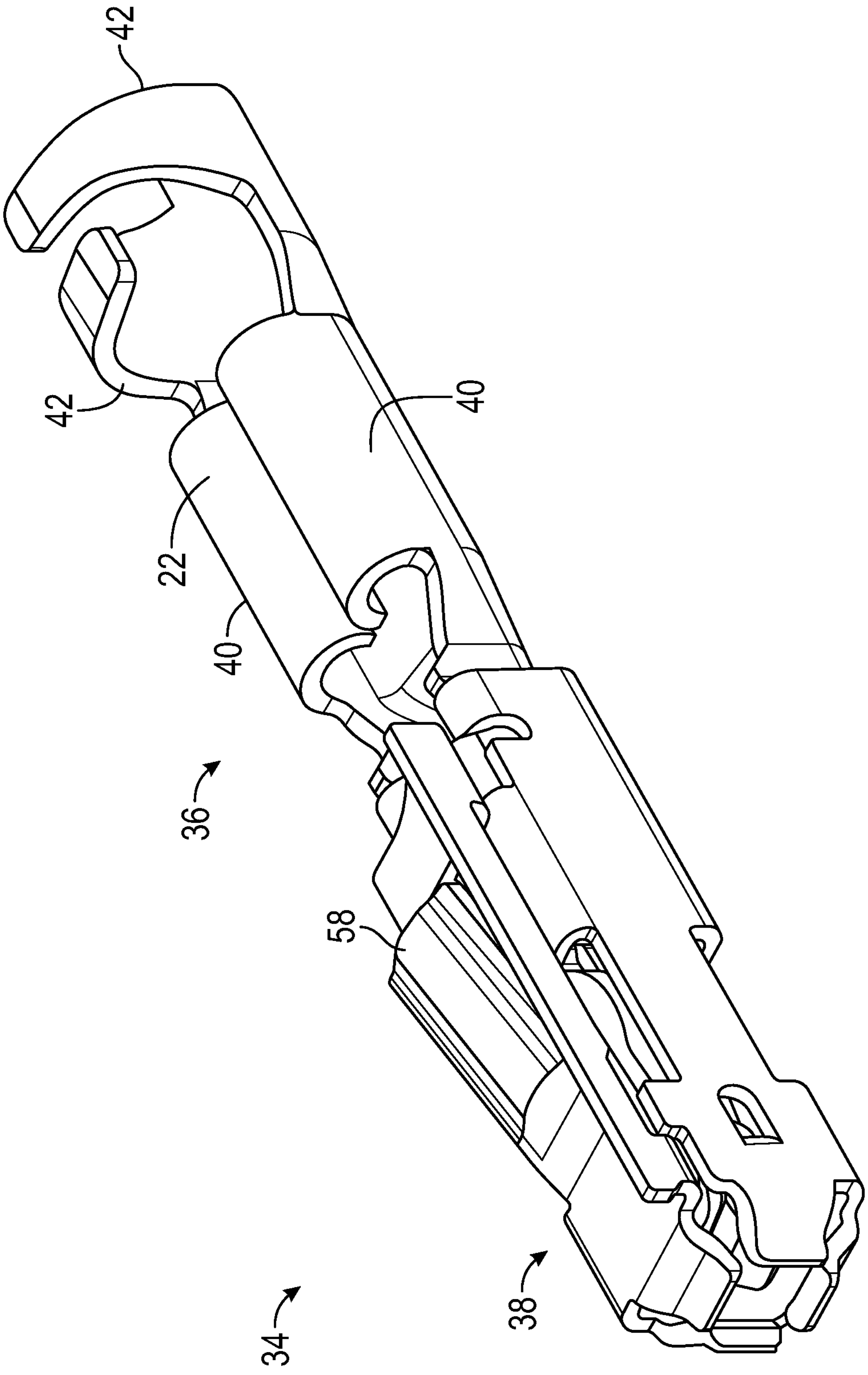
FIG. 4 is a front perspective view of an electrical terminal in a deformed state for use in the electrical connector illustrated in FIG. 3.

Illustrated in FIG. 4, An electrical terminal similar to the previously described prior art electrical terminal 10 is indicated generally at 34. The electrical terminal 34 includes a crimp portion, indicated generally at 36 and a contact portion, indicated generally at 38, that is attached to the crimp portion 36 and that is adapted to engage a corresponding electrical terminal (not shown). The crimp portion 36 includes two conductor wings 40, as well as two insulator wings 42. As shown in FIG. 4, the electrical terminal 34 is in a deformed state, wherein the conductor wings 40 are bent toward inwardly toward each other and the insulator wings 42 are also bent inwardly toward each other. The electrical terminal 34 may be deflected to the deformed state by subjecting the electrical terminal 34 to a crimping process (similarly to the prior art electrical terminal as illustrated in FIG. 2), without engaging the wire 20. The electrical terminal 34 may be deflected to the deformed state by hand or by machine, using a crimping device (not shown) as is known in the art.

As best shown in FIG. 5, the deformed electrical terminal 34 is positioned in one of the terminal cavities 30. Although only one electrical terminal 34 is shown in FIG. 5, each terminal cavity 30 can accommodate one electrical terminal 34. Each terminal cavity 30 includes a contact area 44 and a connection area 46. When the electrical terminal 34 is positioned in the terminal cavity 30, the contact portion 38 of the electrical terminal 34 is located in the contact area 44. The body 28 surrounds the contact area 44 on four sides and serves to protect the contact portion 38 of the electrical terminal 30 from damage. Further, when the electrical terminal 34 is positioned in the terminal cavity 30, the crimp portion 36 of the electrical terminal 34 is located in the connection area 46. The connection area 46 of each terminal cavity 30 is a channel that is at least partially open in a block direction 48. The illustrated electrical terminal 34 is positioned in the terminal cavity 30 with the conductor wings 40 and the insulator wings 42 exposed in the block direction 48. However, the electrical terminal 34 may be positioned in the terminal cavity 30 with any desired orientation.

Figure 6:
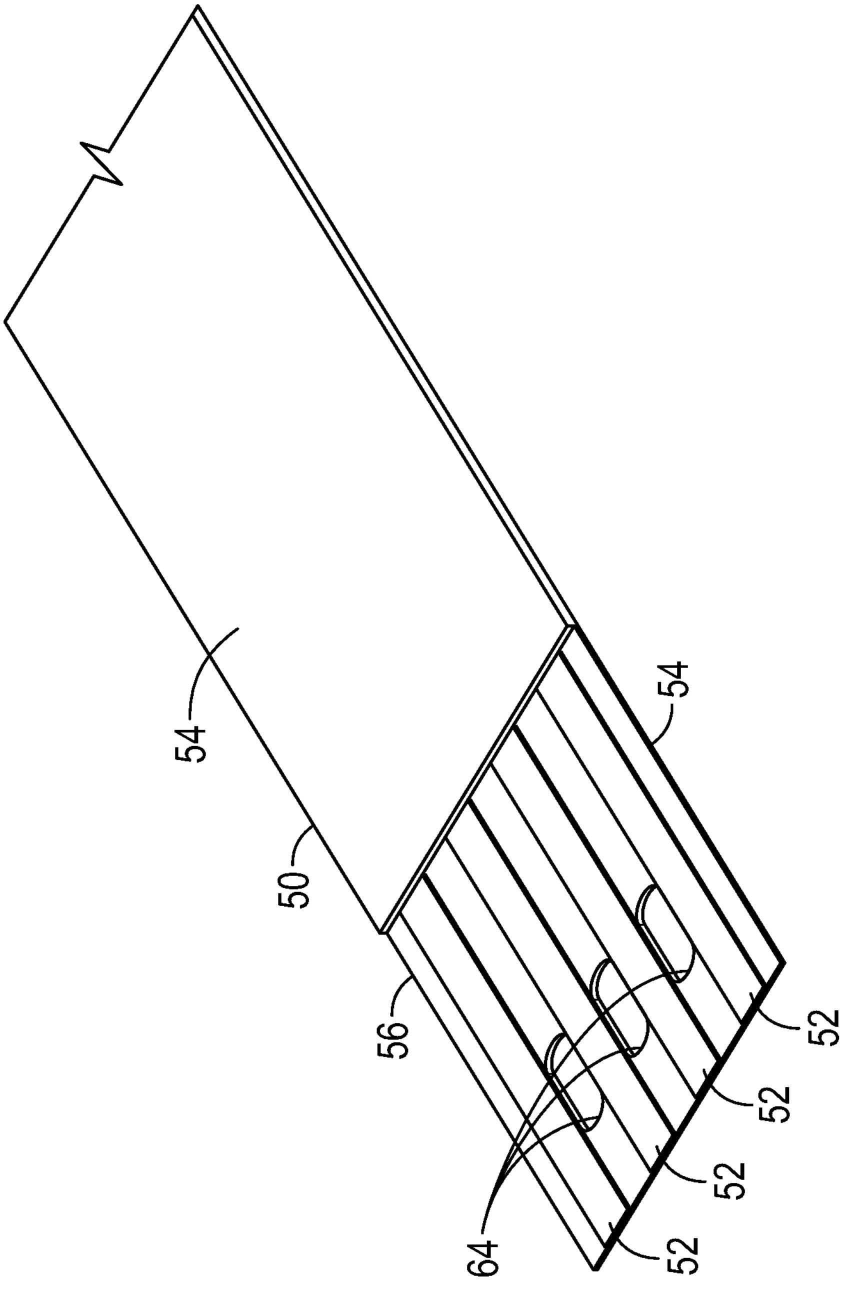
FIG. 6 is a bottom perspective view of a flexible flat cable that includes a stripped portion that exposes parts of four electrical conductors.

As illustrated in FIG. 6, a flexible flat cable 50 includes conductors 52 that are sandwiched between two insulators 54. The illustrated flexible flat cable 50 includes four conductors 52 but may include any desired number. The flexible flat cable 50 includes a stripped portion 56 wherein one of the insulators 54 is removed to expose part of each of the conductors 52.

Figure 7:
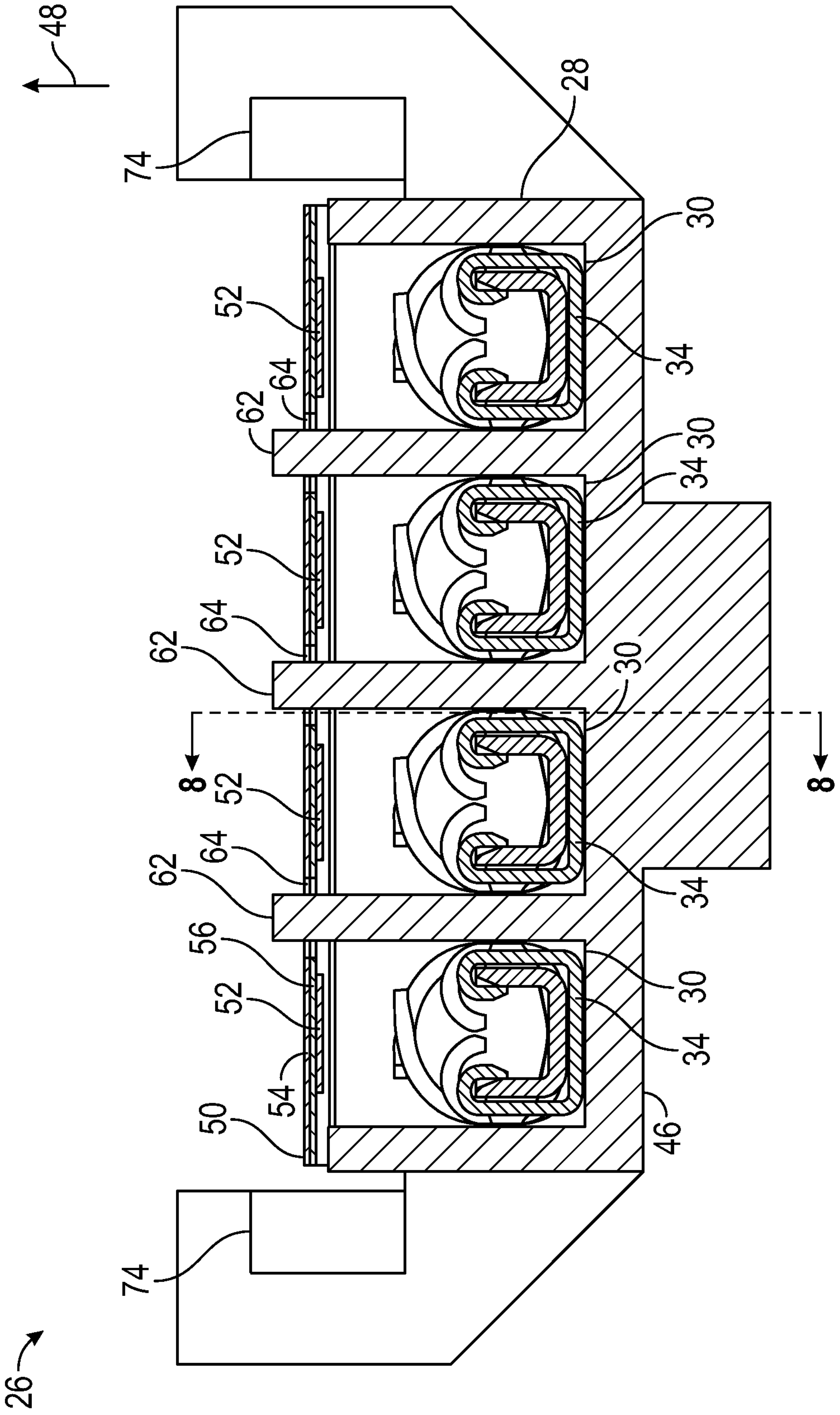
FIG. 7 is a cross-sectional view taken through the electrical connector from FIGS. 3 and 5, with four electrical terminals positioned in the electrical connector and the flexible flat cable positioned adjacent to the electrical terminals.
Figure 8:
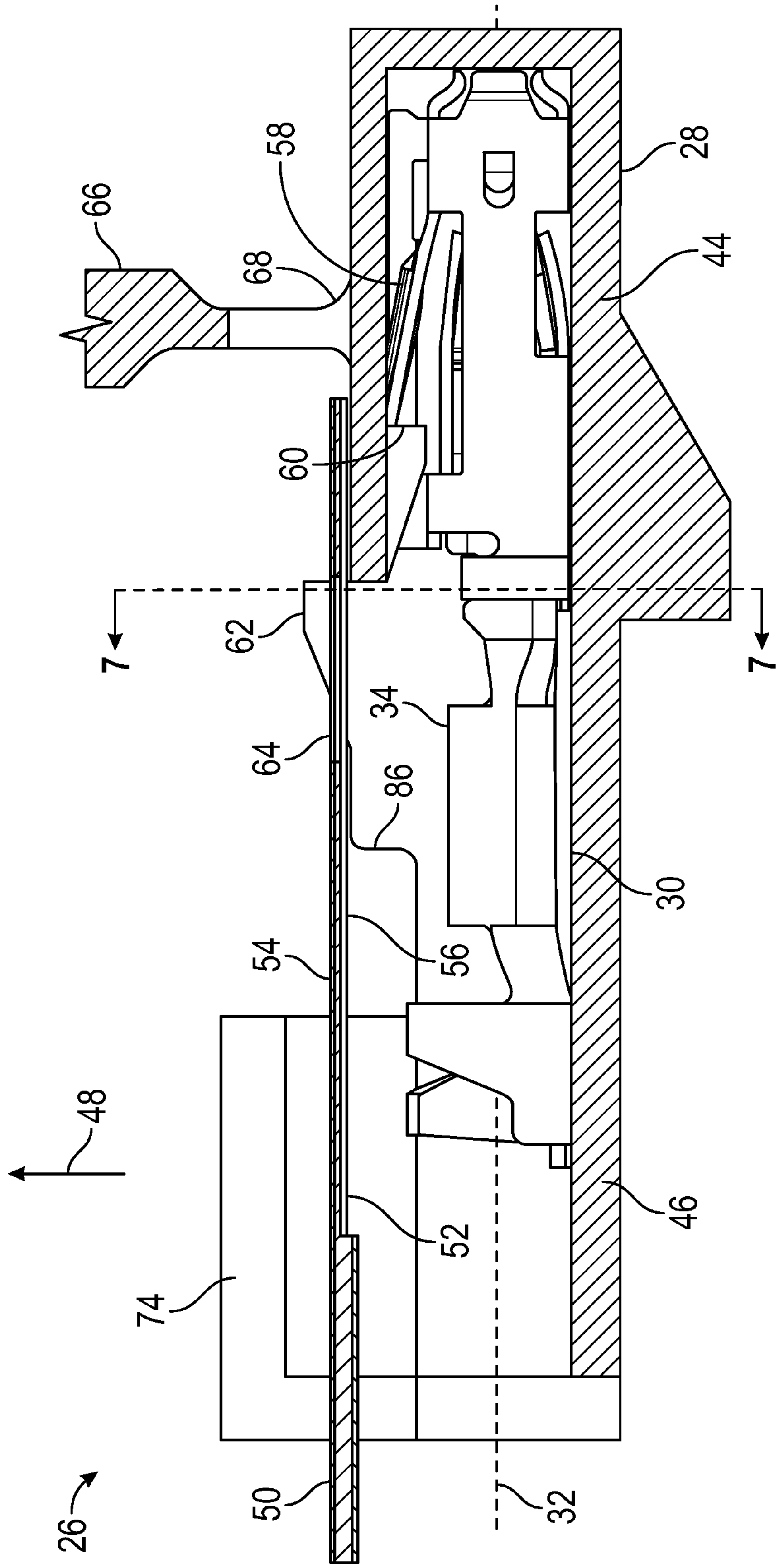
FIG. 8 is a cross-sectional view taken along line 8-8 of FIG. 7.

The cross-sectional views in FIGS. 7 and 8 show the electrical connector 26 holding four electrical terminals 34, one in each of the terminal cavities 30. As shown in FIG. 8, a locking lance 58 on the illustrated electrical terminal 34 engages a ledge 60 on the electrical connector 26 in order to retain the electrical terminal 34 in the respective terminal cavity 30. However, any desired terminal lock mechanism may be used to retain the electrical terminal 34 in the terminal cavity 30. Also shown in FIGS. 8 and 9, the flexible flat cable 50 is located in an initial position adjacent to the electrical connector 26, with the stripped portion 56 adjacent to the connection area 46 so that the exposed part of each conductor 52 is located in the block direction 48 from one of the electrical terminals 34.

As shown in FIG. 5, the electrical connector 26 includes a plurality of hooks 62 that serve to hold the flexible flat cable 50 in the initial position relative to the electrical connector 26. Each of the hooks 62 is a projection from the body 28 that extends in the block direction 48. The illustrated hooks 62 are located in the connection area 46 and are between adjacent terminal cavities 30. However, the hooks 62 may be in any desired location on the electrical connector 26.

As shown in FIG. 6, the flexible flat cable 50 includes a plurality of slots 64 that extend through the flexible cable 50. The illustrated slots 64 are located in the stripped portion 56 of the flexible flat cable 50 between adjacent conductors 52 and extend through one of the insulators 54. However, the slots 64 may be in any desired location on the flexible flat cable 50. When the flexible flat cable 50 is placed in the initial position, as shown in FIGS. 7 and 8, each of the hooks 62 extends through one of the slots 64 in order to properly position the flexible flat cable 50 relative to the electrical connector 26.

As best shown in FIGS. 3 and 5, the electrical connector 26 includes a block 66 that is movable relative to the body 28. The illustrated block 66 is molded with the body 28 as a single-piece electrical connector 26 and the block 66 is attached to the body 28 by a living hinge 68 which allows the block 66 to be rotated relative to the body 28. However, the block 66 may be separate piece if desired. In order to attach the flexible flat cable 50 to the electrical connector 26, the block 66 is placed in a latched position to create the electrical connector assembly illustrated in FIGS. 9 and 10. In the latched position, the block 66 is located adjacent to the connection area 46 and in the block direction 48 from the electrical terminals 34. The stripped portion 56 of the flexible flat cable 50 is located between the block 66 and the electrical terminals 34. Part of the flexible flat cable 50 is moved opposite the block direction 48 relative to the connection area 46 by the block 66, and each of the conductors 52 is pressed into engagement with the respective electrical terminal 34. As shown in FIG. 5, the block 66 includes multiple spaces 70 that are positioned so that each hook 62 enters a space 70 when the block 66 is in the latched position.

Figure 9:
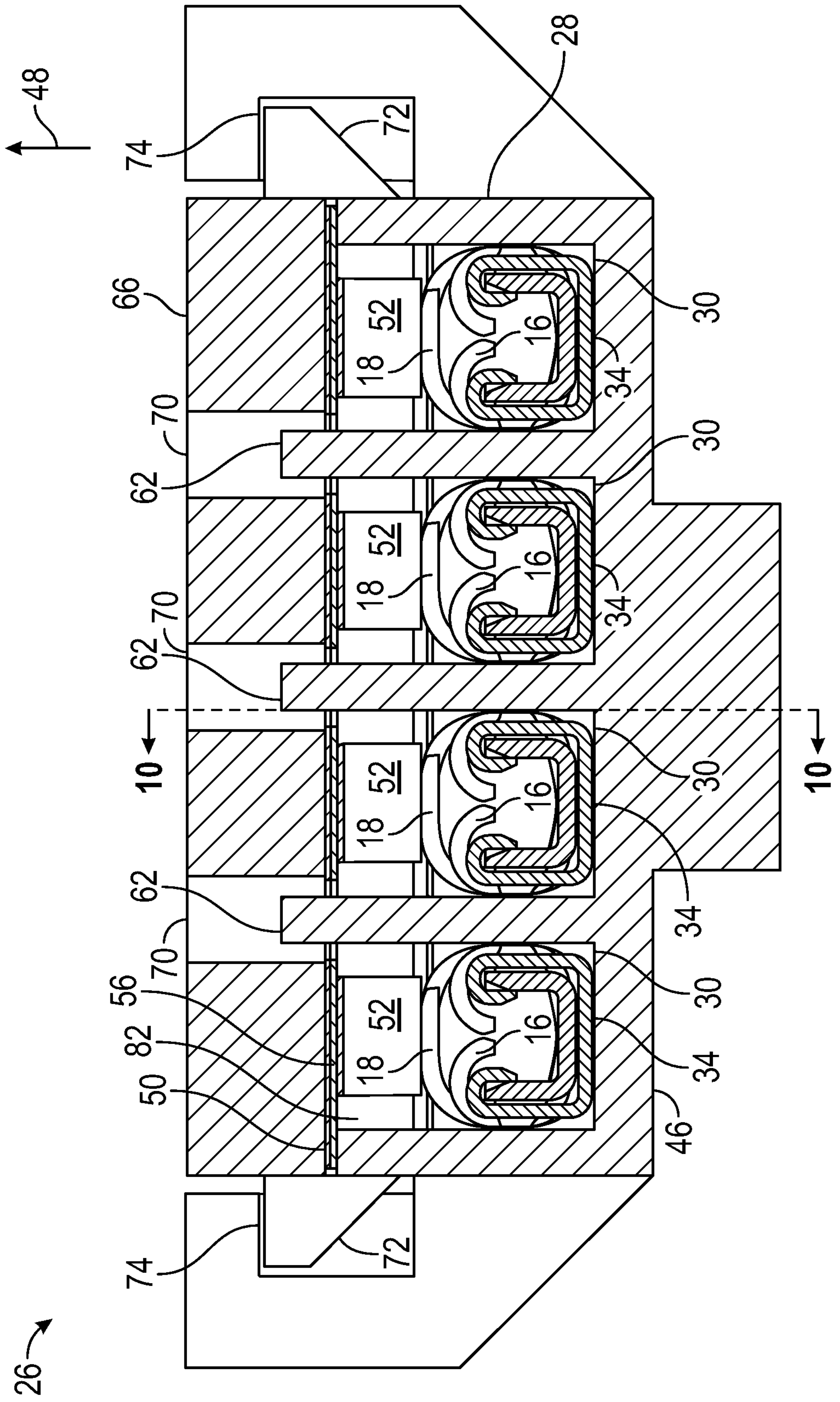
FIG. 9 is a cross-sectional view similar to FIG. 7 showing an electrical connector assembly that includes the electrical connector in a latched position wherein the flexible flat cable is pressed against the electrical terminals.
Figure 10:
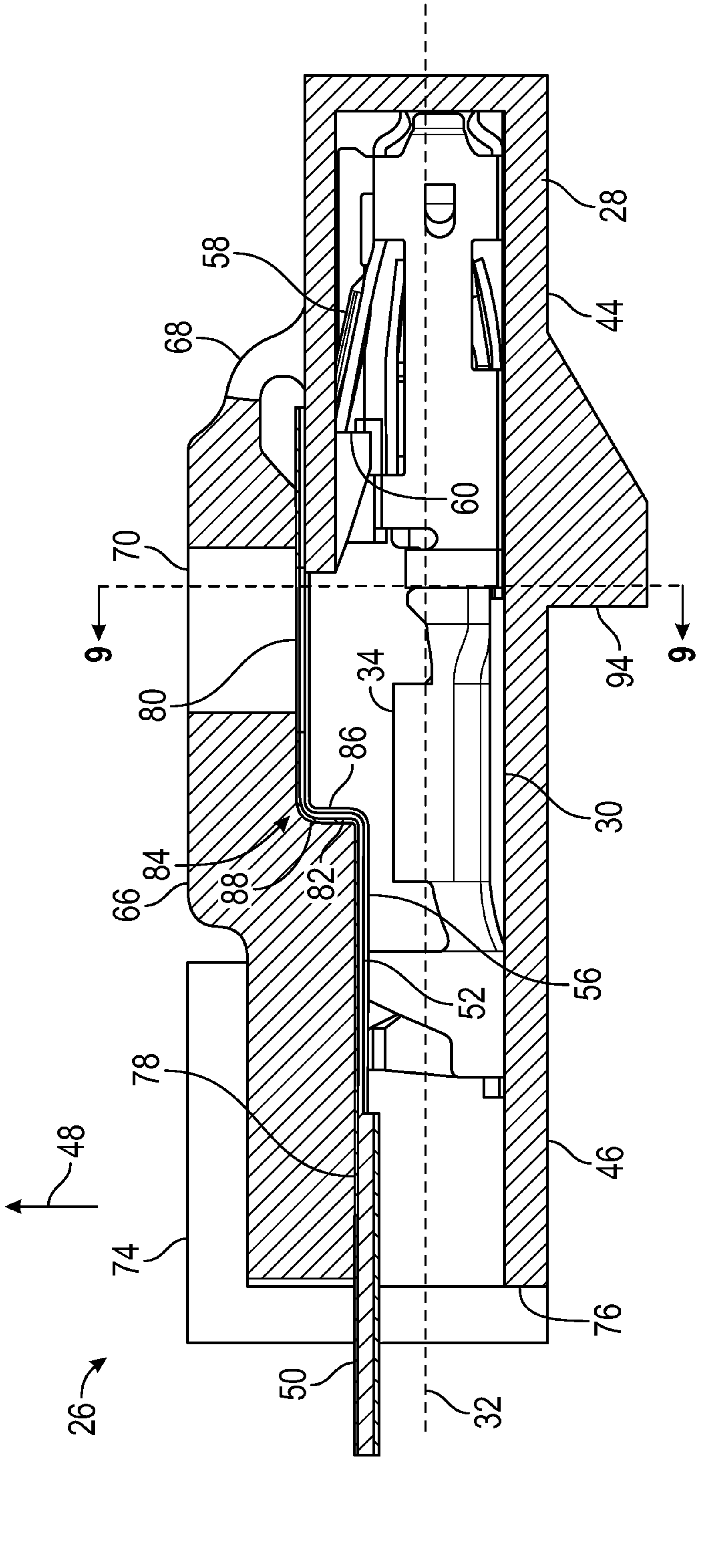
FIG. 10 is a cross-sectional view taken along line 10-10 of FIG. 9.

When the block 66 is in the latched position, the electrical terminal 34 is compressed between the block 66 and the opposed side of the terminal cavity 30. This causes the insulator wings 42 to be moved from the deformed state (illustrated in FIGS. 4, 7, and 8) to a stressed state (illustrated in FIGS. 9 and 10). In the stressed state, each electrical terminal 34 applies a spring force against the block 66, which maintains contact between the electrical terminal 34 and the respective conductor 52. As shown in FIGS. 9 and 10, the stressed insulator wings 42 are pressed into engagement with the respective conductor 52, which provide electrical communication between the conductor 52 and the contact portion 38 of the electrical terminal 34. The spring force exerted by the insulator wings 42 provides a mechanical force to maintain this electrical connection.

The block 66 is held in the latched position relative to the body 28 by a stop 72 on the block 66 that engages a lock 74 on the body 28. In the illustrated embodiment, the body 28 includes two locks 74 located on opposed sides of the connection area 46 and two stops 72 extend from opposed sides of block 66. However, the electrical connector 26 may include any desired number and arrangement of stops 72 and locks 74.

As best shown in FIG. 10, when electrical connector 26 is latched onto the flexible flat cable 50, the flexible flat cable 50 enters the electrical connector 26 a connector end 76 and extends into a connection part 78 that is generally parallel to the terminal axes 32. The electrical terminal 34 engages the flexible flat cable 50 in the connection part 78. The flexible flat cable 50 also includes a hooked part 80 that is also generally parallel to the terminal axes 32. The hooks 62 on the electrical connector 26 engage the flexible flat cable 50 in the hooked part 80. The flat flexible cable 50 includes an offset 82 that is located between the connection part 78 and the hooked part 80 and is not generally parallel to the terminal axes 32. The illustrated offset 82 is generally perpendicular to the terminal axes 32 but may have any desired orientation. The offset is located in a catch on the electrical connector 26, that is indicated generally at 84. The catch 84 includes a body catch 86 and a block catch 88. When the block 66 is in the latched position, the body catch 86 and the block catch 88 cooperate to define a channel that is generally perpendicular to the terminal axes 32, but the channel may have any desired orientation. When the block 66 is in the latched position, the offset 82 is pinned in the catch 84, which prevents the flat flexible cable 50 from being pulled out of the connector end 76.

Figure 11:
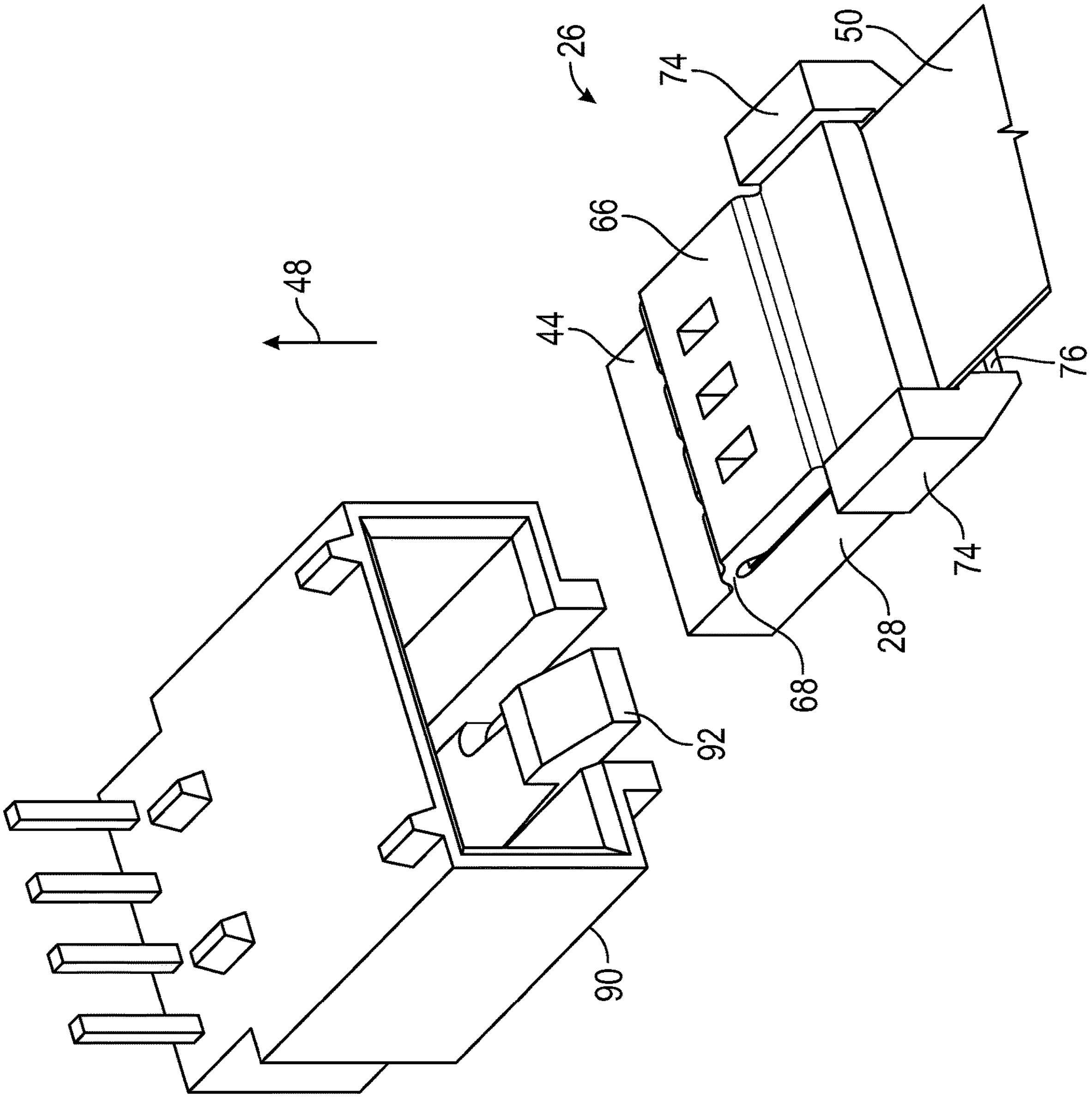
FIG. 11 is a rear perspective view of the electrical connector assembly from FIG. 9 and a corresponding connector.
Figure 12:
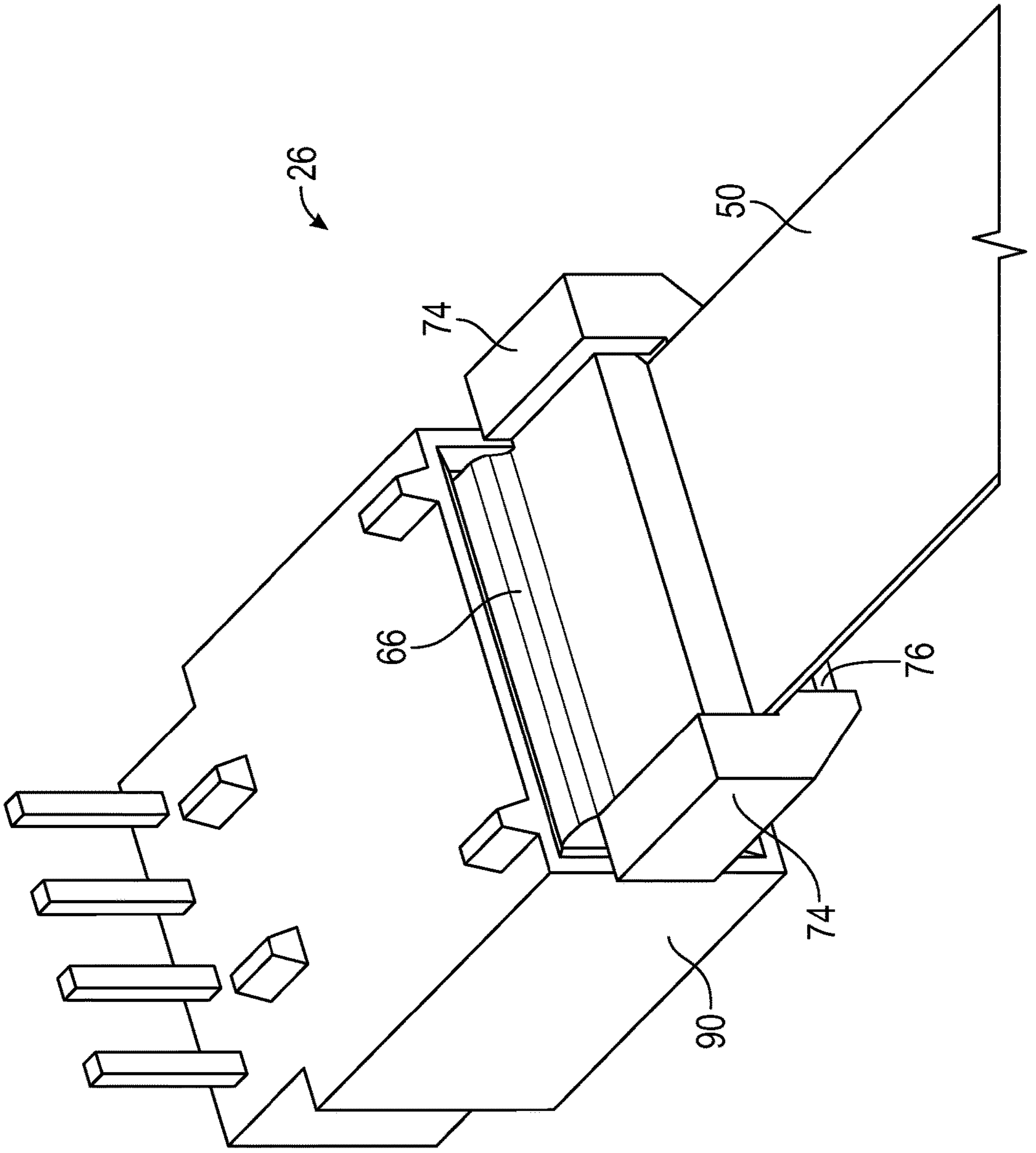
FIG. 12 is a rear perspective view similar to FIG. 11 showing the electrical connector assembly mated with the corresponding connector.

FIG. 11 illustrates the electrical connector 26 and the attached flexible flat cable 50 positioned to be mated with a corresponding connector 90. When the electrical connector 26 is mated with the corresponding connector 90, as shown in FIG. 12, the block 66 is located at least partially between the body 28 and the corresponding connector 90, which further locks the block 66 in place relative to the body 28. As shown in FIG. 11, the corresponding connector 90 includes a connector latch 92 The connector latch 92 is adapted to engage a connector catch 94 on the electrical connector 26, that is shown on FIG. 10, in order to retain the electrical connector 26 in place relative to the corresponding connector 90.

Figure 13:
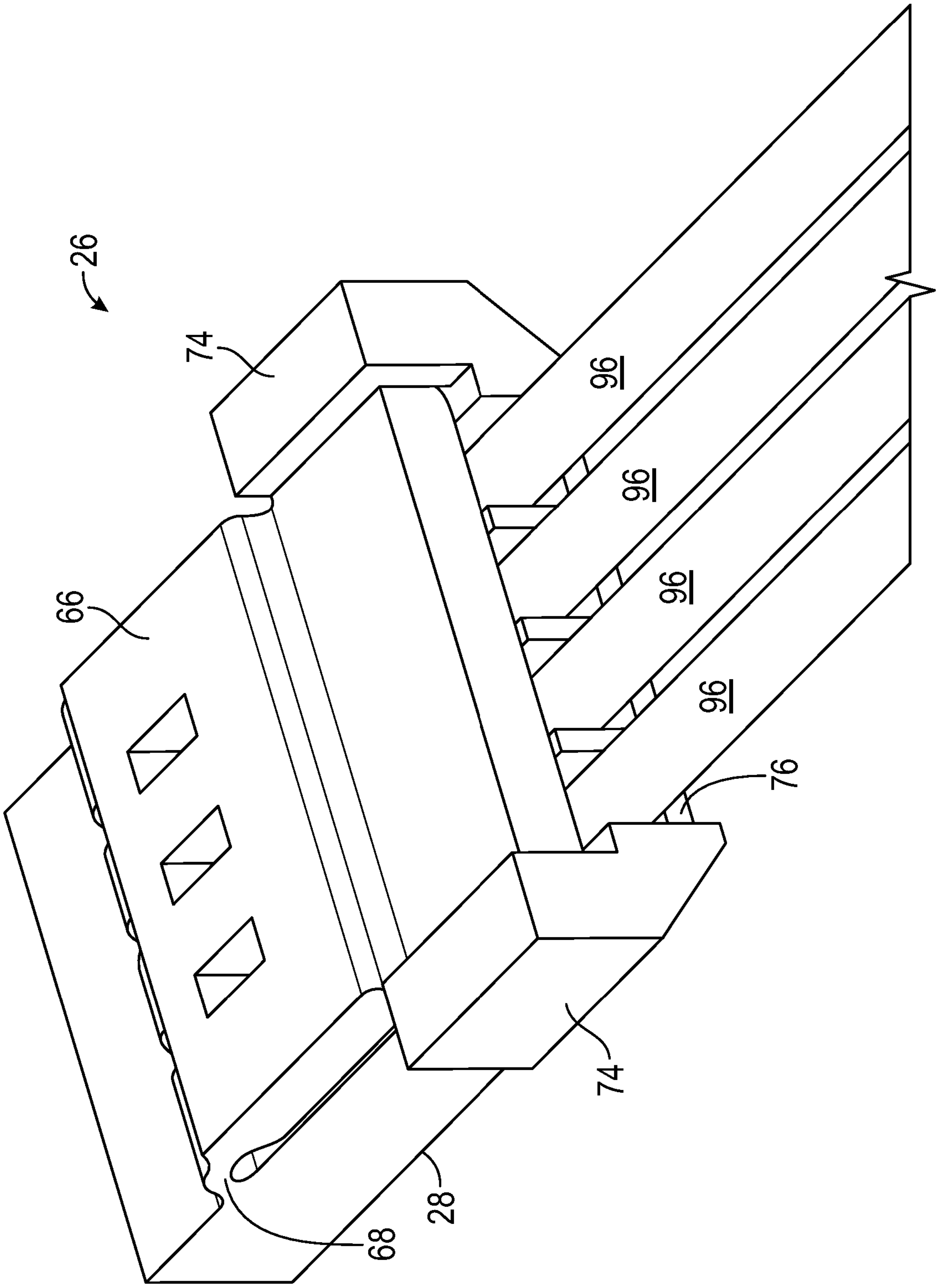
FIG. 13 is a rear perspective view similar to FIG. 11 showing the electrical connector attached to four conventional round wires rather than the flexible flat cable.
Figure 14:
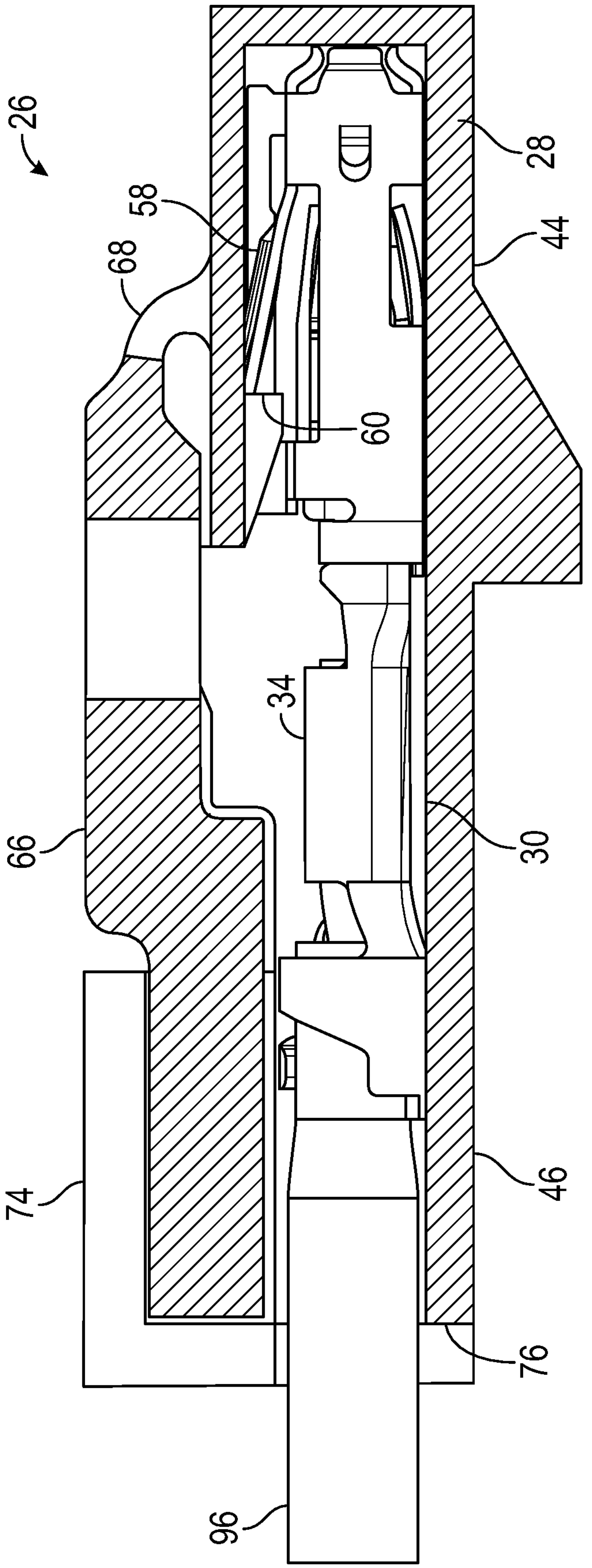
FIG. 14 is a cross-sectional view taken along line 14-14 of FIG. 13.
Figure 15:
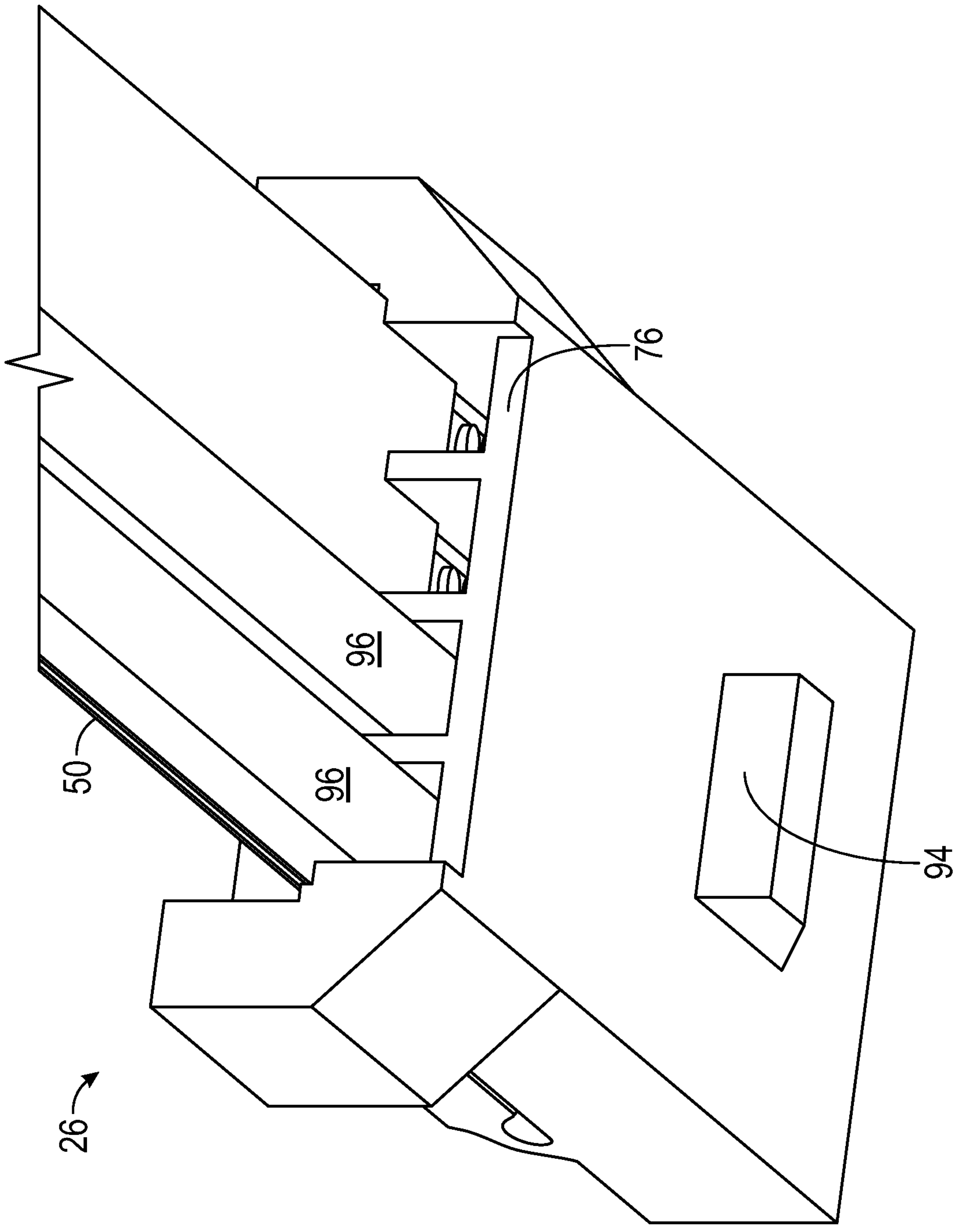
FIG. 15 is a perspective view from below showing the electrical connector attached to the flexible flat cable as well as round wires.

The illustrated electrical connector 26 may also be used with conventional round wires 96, as illustrated in FIGS. 13 and 14. As illustrated, each of the electrical terminals 34 may be crimped to a respective wire 96 (similarly to the previously described electrical terminal 10). The illustrated terminal cavities are open at the connector end 76 to allow each of the wires 96 to extend out of the respective terminal cavity 32. As further illustrated in FIG. 15, the electrical connector 26 may also be used with both the flexible flat cable 50 and one or more of the wires 96 simultaneously. This allows one or more of the terminals 32 to be in electrical communication with the wires 96, while one or more other of the terminals 32 are in electrical communications with the conductors 52 in the flexible flat cable 50.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical connector, comprising:

a body defining a terminal cavity defining a terminal axis and adapted to accommodate an electrical terminal, the terminal cavity including a contact area including a terminal lock, and a connection area open in a block direction perpendicular to the terminal axis;

a block movable relative to the body to a latched position, wherein the block is located in the block direction from the connection area; and a catch comprising a body catch and a block catch such that the body catch and the block catch form a channel adapted to position an offset of a flat flexible cable within the channel.

2. The electrical connector of claim 1, wherein the electrical connector includes a plurality of hooks extending from the body in the block direction and adapted to engage the flexible flat cable.

3. The electrical connector of claim 2, wherein the block includes a plurality of spaces and wherein each of the plurality of hooks is located in one of the plurality of spaces when the block is in the latched position.

4. The electrical connector of claim 1, wherein the block is attached to the body and is rotatable relative to the body to the latched position.

5. The electrical connector of claim 1, wherein the body includes a lock that engages a stop on the block to retain the block in the latched position relative to the body.

6. The electrical connector of claim 1, wherein the terminal axis extends through a connector end that is adjacent to the connection area and the terminal cavity is open at the connector end.

7. The electrical connector of claim 1, wherein when the block is in the latched position, the catch is defined between the block and the body, and wherein the catch is a channel that extends at an angle relative to the terminal axis.

8. The electrical connector of claim 1, wherein when the block in the latched position, the catch is defined between the block and the body, and wherein the catch is a channel extending generally perpendicular to the terminal axis.

9. An electrical connector, comprising:

a body defining a terminal cavity defining a terminal axis and adapted to accommodate an electrical terminal, the terminal cavity including a contact area including a terminal lock, a connection area open in a block direction perpendicular to the terminal axis, and wherein the terminal axis extends through a connector end adjacent to the connection area and the terminal cavity is open at the connector end;

a plurality of hooks extending from the body in the block direction and adapted to engage a flexible flat cable;

a block movable relative to the body to a latched position, wherein the block is located in the block direction from the connection area, the block includes a plurality of spaces, wherein each of the plurality of hooks is located in one of the plurality of spaces when the block is in the latched position; and a catch comprising a body catch and a block catch such that the body catch and the block catch form a channel adapted to position an offset of a flat flexible cable within the channel, wherein when the block in the latched position, the catch is defined between the block and the body, and wherein the catch is a channel extending at an angle relative to the terminal axis.

10. An electrical connector assembly, comprising:

a body defining a terminal cavity;

an electrical terminal located in the terminal cavity and retained in the terminal cavity by a terminal lock, the electrical terminal including deformed crimp wings;

a block movable relative to the body to a latched position; and a flexible flat cable located at least in part between the block and the electrical terminal when the block is in the latched position, the flexible flat cable including a conductor engaged with the electrical terminal, wherein when the block is in the latched position, the deformed crimp wings are in a stressed position and the electrical terminal applies a spring force against the block.

11. The electrical connector assembly of claim 10, wherein the block is attached to the body and is rotatable relative to the body to the latched position.

12. The electrical connector assembly of claim 10, wherein when the block is in the latched position, the deformed crimp wings are engaged with the conductor.

13. The electrical connector assembly of claim 10, wherein the electrical connector includes hooks extending from the body in a block direction and engaging the flexible flat cable.

14. The electrical connector assembly of claim 13, wherein the flexible flat cable includes a connection part engaged with the electrical terminal, a hooked part engaged with the hooks, and an offset located between the connection part and the hooked part is at an angle relative to the connection part.

15. The electrical connector assembly of claim 14, wherein the terminal cavity defines a terminal axis, wherein the connection part extends parallel to the terminal axis, and wherein the offset extends perpendicular to the terminal axis.

16. The electrical connector assembly of claim 15, wherein the block is attached to the body and is rotatable relative to the body to the latched position.

17. The electrical connector assembly of claim 15, wherein when the block is in the latched position, the deformed crimp wings are engaged with the conductor.

18. The electrical connector assembly of claim 10, wherein the terminal cavity defines a terminal axis, wherein the flexible flat cable is located in a block direction from the terminal cavity, and wherein the block direction is perpendicular to the terminal axis.

19. The electrical connector assembly of claim 18, wherein the terminal cavity includes a contact area including the terminal lock, a connection area open in the block direction, wherein the terminal axis extends through a connector end adjacent to the connection area, and wherein the terminal cavity is open at the connector end.

20. The electrical connector of claim 1, wherein the offset extends perpendicular to the terminal axis.

* * * * *